(12) United States Patent
Tseng et al.

(10) Patent No.: US 10,804,013 B2
(45) Date of Patent: Oct. 13, 2020

(54) OVER-CURRENT PROTECTION DEVICE

(71) Applicant: Polytronics Technology Corp., Hsinchu (TW)

(72) Inventors: Chun-Teng Tseng, Miaoli County (TW); David Shau Chew Wang, Taipei (TW)

(73) Assignee: Polytronics Technology Corp., Hsinchu (TW)

( * ) Notice: Subject to any disclaimer, the term of this patent is extended or adjusted under 35 U.S.C. 154(b) by 0 days.

(21) Appl. No.: 16/589,704

(22) Filed: Oct. 1, 2019

(65) Prior Publication Data

US 2020/0273609 A1    Aug. 27, 2020

(30) Foreign Application Priority Data

Feb. 22, 2019  (TW) .............................. 108106020 A (51) Int. Cl.
  *H01C 1/14*     (2006.01)
  *H01C 7/13*     (2006.01)
  *H02H 9/02*     (2006.01)
  *H01C 7/02*     (2006.01)

(52) U.S. Cl.
  CPC ........... *H01C 7/022* (2013.01); *H01C 1/1406* (2013.01); *H01C 7/13* (2013.01); *H02H 9/026* (2013.01)

(58) Field of Classification Search
  CPC ......... H01C 7/022; H01C 1/1406; H01C 7/13
  See application file for complete search history.

(56) References Cited

U.S. PATENT DOCUMENTS

| | | | | |
|---|---|---|---|---|
| 4,434,416 A | * | 2/1984 | Schonberger | H01C 7/04 338/22 R |
| 5,210,516 A | * | 5/1993 | Shikama | H01C 1/024 338/22 R |
| 5,907,272 A | * | 5/1999 | McGuire | H01C 1/1406 337/153 |
| 6,556,123 B1 | * | 4/2003 | Iwao | H01C 1/1406 338/22 R |
| 7,119,655 B2 | * | 10/2006 | Starling | H01C 1/1406 338/22 R |

(Continued)

FOREIGN PATENT DOCUMENTS

CN          2615831 Y      5/2004

*Primary Examiner* — Kyung S Lee
(74) *Attorney, Agent, or Firm* — Muncy, Geissler, Olds & Lowe, P.C.

(57) ABSTRACT

An over-current protection device is a hexahedron comprising an upper surface, a lower surface and four lateral surfaces. The over-current protection device comprises a PTC device, a first insulating layer, a first electrode layer and a second electrode layer. The PTC device comprises a first conductive layer, a second conductive layer and a PTC material layer laminated therebetween. The first conductive layer comprises a first conductive section and a second conductive section separated by at least one trench. The first insulating layer is disposed on the first conductive layer. The first electrode layer is disposed on the first insulating layer and electrically coupled to the first conductive section. The second electrode layer is disposed on the first insulating layer and electrically coupled to the second conductive section. The trench comprises a primary portion not parallel to a longitudinal direction of the first and second electrode layers.

14 Claims, 9 Drawing Sheets

(56) References Cited

U.S. PATENT DOCUMENTS

| | | | | |
|---|---|---|---|---|
| 7,173,511 B2* | 2/2007 | Han | ........................ | H01C 1/148 338/22 R |
| 8,432,247 B2* | 4/2013 | Wang | ..................... | H02H 9/026 338/195 |
| 8,558,656 B2* | 10/2013 | Wang | ..................... | H02H 9/026 338/195 |
| 9,112,348 B2* | 8/2015 | Tseng | ..................... | H02H 9/026 |
| 2003/0227368 A1* | 12/2003 | Huang | ................. | H01C 1/1406 338/22 R |
| 2003/0227731 A1* | 12/2003 | Huang | ................. | H01C 1/1406 361/103 |
| 2004/0108936 A1* | 6/2004 | Han | ..................... | H01C 1/1406 338/22 R |
| 2004/0218329 A1* | 11/2004 | Becker | ................... | H01C 1/016 361/106 |
| 2005/0062581 A1* | 3/2005 | Koyama | ................... | G01K 7/22 338/22 R |

\* cited by examiner

OVER-CURRENT PROTECTION DEVICE

BACKGROUND OF THE INVENTION

(1) Field of the Invention

The present application relates to a thermistor, and more particularly to an over-current protection device.

(2) Description of the Related Art

Positive temperature coefficient (PTC) devices can be used for protecting circuitries from damages resulted from over-heat or over-current. A PTC device usually contains two electrodes and a resistive material disposed therebetween. The resistive material has PTC characteristic that the resistance thereof remains extremely low at room temperature and instantaneously increases to thousand times when the temperature reaches a critical temperature or the circuit has over-current, so as to suppress over-current and protect the cell or the circuit device. Moreover, the PTC device can be applied to an over-temperature sensing circuit, it detects ambient temperature upon which proper action. e.g., power off, is activated for over-temperature protections. When the material gets back to the room temperature or over-current no longer exists, the over-current protection device returns to be of low resistance and as a consequence the circuitry can operate normally. In view of the reusability, the PTC over-current protection devices can replace traditional fuses and have been widely applied to high density circuits.

With lightweight and compact trends, electronic apparatuses are getting smaller. For a cell phone, a number of components have to be integrated into a limited space, in which an over-current protection device is usually secured to a protective circuit module (PCM) and its external lead will occupy a certain space. Therefore, it is desirable to have a miniaturized protection device that does not take up much room. In the applications of the surface mountable over-current protection device, it is a great challenge on miniaturization to develop the protection devices of 0402 or 0201 size.

A known surface mountable PTC device contains a left electrode and a right electrode with a trench therebetween formed by etching metal layers, e.g., copper layers. For a large device, upper and lower metal layers have sufficient area providing structural strength. For a small device, however, the area of the upper or lower metal layer becomes insufficient due to etched trench. As a result, the structure becomes weak and is easily deformed or damaged caused by inflation of PTC material during soldering. The deformation affects voltage endurance and resistance stability of the PTC device.

SUMMARY OF THE INVENTION

The present application relates to an over-current protection device providing over-current protection and/or temperature detection. The over-current protection device comprises a PTC material layer and first and second conductive layers disposed thereon. The first conductive layer comprises two conductive sections separated by at least one trench or isolation. The trench and bonding pads of the over-current protection device extend in different directions to overlap the conductive sections and the bonding pads for increasing structural strength. Therefore, the deformation or damage of the device due to rapid inflation of the PTC material layer is avoided.

In accordance with an embodiment of the present application, an over-current protection device is a hexahedron comprising an upper surface, a lower surface and four lateral surfaces. The over-current protection device comprises a PTC device, a first insulating layer, a first electrode layer and a second electrode layer. The PTC device comprises a first conductive layer, a second conductive layer and a PTC material layer. The first conductive layer is disposed on a first surface of the PTC material layer, and the second conductive layer is disposed on a second surface of the PTC material layer. The second surface is opposite to the first surface. The first conductive layer comprises a first conductive section and a second conductive section separated by at least one trench. The first insulating layer is disposed on a surface of the first conductive layer. The first electrode layer is disposed on the first insulating layer and electrically coupled to the first conductive section. The second electrode layer is disposed on the first insulating layer and electrically coupled to the second conductive section. The trench comprises a primary portion not parallel to a longitudinal direction of the first and second electrode layers.

In an embodiment, the first electrode layer and the second electrode layer are in stripe shapes extending in a first direction, and the primary portion extends in a second direction not parallel to the first direction.

In an embodiment, the trench extends along an oblique line of the first conductive layer.

In an embodiment, the trench extends along a diagonal line of the first conductive layer.

In an embodiment, the first conductive section and the second conductive section have equivalent areas.

In an embodiment, the trench connects to two adjacent lateral surfaces. In an embodiment, the trench is arc-shaped or L-shaped.

In an embodiment, an area of the second conductive section is more than 1.2 times an area of the first conductive section.

In an embodiment, the first conductive section electrically connects to the second conductive layer.

In an embodiment, the first conductive layer is divided into the first conductive section and the second conductive section by two intersecting trenches.

In an embodiment, the first conductive section is $1/5$ to $1/3$ of the first conductive layer in area, and the second conductive section is $1/5$ to $1/3$ of the first conductive layer in area.

In an embodiment, corners of the four lateral surfaces are provided with insulating members.

In an embodiment, the first conductive layer has two opposite sides not exposed to corresponding lateral surfaces.

In an embodiment, the over-current protection device further comprises a second insulating layer disposed on the second conductive layer.

In an embodiment, the second conductive layer is divided into other two conductive sections by another trench, and the trench of the second conductive layer crosses over the trench of the first conductive layer In the over-current protection device of the present application, the trench of an inner conductive layer and bonding pads extend in different directions so as to enhance structural strength. Therefore, a miniaturized device with the metal conductive layers of a small area is still robust to resist deformation caused by the inflation of PTC material during soldering.

The design is suitable for small devices such as 0402 or 0201 size.

BRIEF DESCRIPTION OF THE DRAWINGS

The present application will be described according to the appended drawings in which.

DETAILED DESCRIPTION OF THE INVENTION

The making and using of the presently preferred illustrative embodiments are discussed in detail below. It should be appreciated, however, that the present application provides many applicable inventive concepts that can be embodied in a wide variety of specific contexts. The specific illustrative embodiments discussed are merely illustrative of specific ways to make and use the invention, and do not limit the scope of the invention.

Figure 1:
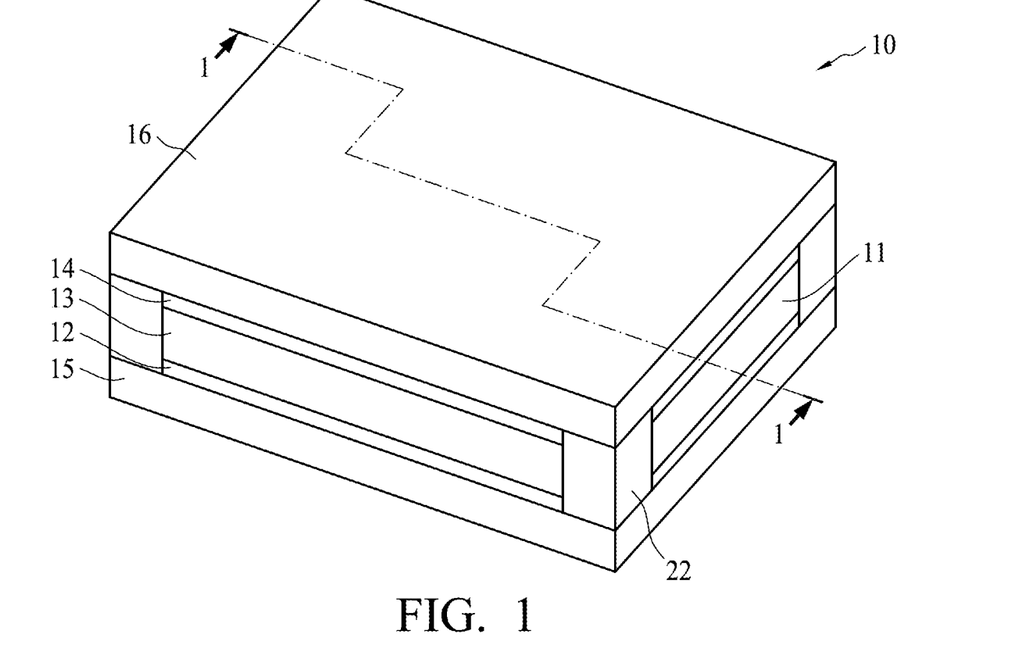
FIG. 1 shows an over-current protection device in accordance with an embodiment of the present application.
Figure 2:
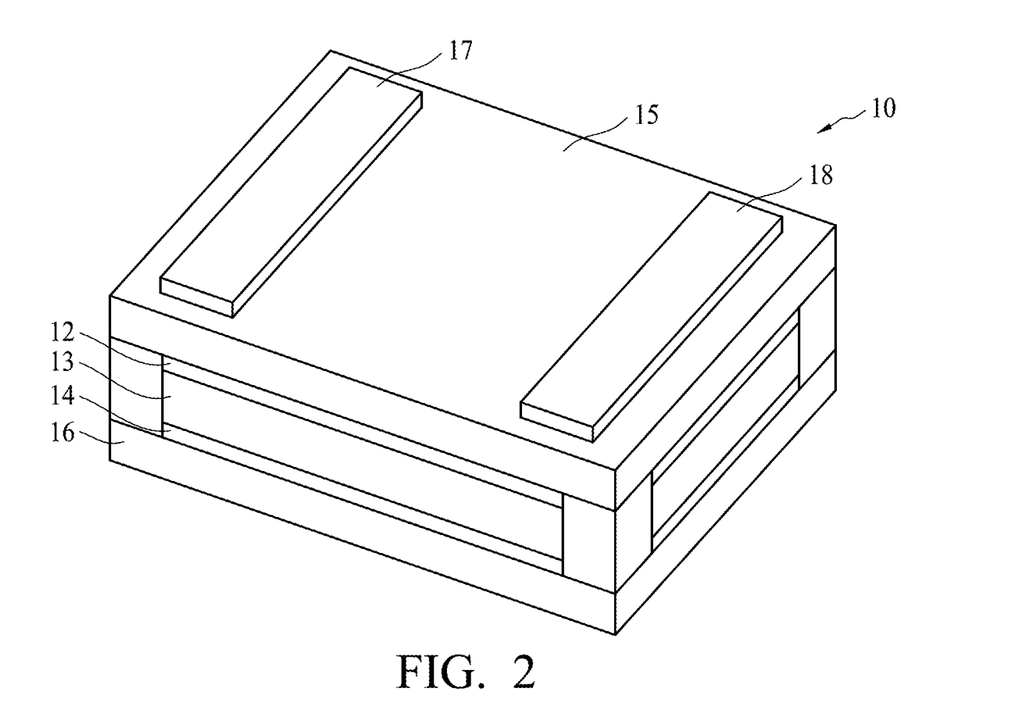
FIG. 2 shows the over-current protection device of FIG. 1 turned upside down.

FIG. 1 shows an over-current protection device in accordance with an embodiment of the present application. FIG. 2 shows the over-current protection device of FIG. 1 turned upside down. An over-current protection device 10 is a hexahedron comprising an upper surface, a lower surface and four lateral surfaces. The over-current protection device 10 comprises a PTC device 11, a first insulating layer 15, a second insulating layer 16, a first electrode layer 17 and a second electrode layer 18. The PTC device 11 comprises a first conductive layer 12, a second conductive layer 14 and a PTC material layer 13 laminated therebetween. The first conductive layer 12 is disposed on a first surface of the PTC material layer 13 and the second conductive layer 14 is disposed on a second surface of the PTC material layer 13. The second surface is opposite to the first surface. The second insulating layer 16 is disposed on the second conductive layer 14. The first insulating layer 15 is disposed on the first conductive layer 12, and the first electrode layer 17 and the second electrode layer 18 are formed on the first insulating layer 15. The first and second electrode layers 17 and 18 are shaped as stripes located at two longitudinal ends of the first insulating layer 15 and serve as bonding pads for soldering onto a circuit board. In an embodiment, the first and second electrode layers 17 and 18 can be plated with tin to improve solderability. The first and second insulating layers 15 and 16 may comprise prepreg, and the first conductive layer 12 and the second conductive layer 14 may be metal layers, e.g., copper foils. The corners of the four lateral surfaces are provided with insulating members 22, which may be ¼ cylinders. The insulating members 22 may contain prepreg or resin tougher than the PTC material layer 13 and, unlike the first and second conductive layers 12 and 14, have no metal ductility. Therefore, the insulating members 22 provide protection to avoid burr occurrence during cutting. The material of the insulating members 22 is not limited to the aforesaid prepreg or resin, materials of required insulation and hardness, e.g., other polymers, are covered by the scope of the present application.

The PTC material layer 13 contains crystalline polymer and conductive filler dispersed therein. The crystalline polymer may comprise polyethylene, polypropylene, polyvinylfluoride, the mixture or the copolymer thereof. The conductive filler may comprise metal filler, metal carbide, metal boride, metal nitride or the mixture thereof. For example, the metal filler may be nickel, cobalt, copper, iron, tin, lead, silver, gold, platinum, or the alloy thereof. The ceramic filler may be titanium carbide (TiC), tungsten carbide (WC), vanadium carbide (VC), zirconium carbide (ZrC), niobium carbide (INC), tantalum carbide (TaC), molybdenum carbide (MoC), hafnium carbide (HfC), titanium boride ($TiB_2$), vanadium boride ($VB_2$), zirconium boride ($ZrB_2$), niobium boride ($NbB_2$), molybdenum boride ($MoB_2$), hafnium boride ($HfB_2$), or zirconium nitride (ZrN). Moreover, the conductive filler may be the mixture, alloy, solid solution or core-shell of the aforesaid metal and ceramic fillers.

Figure 3:
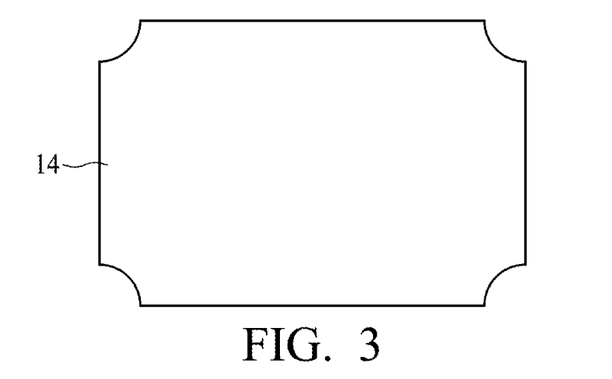
FIGS. 3 to 5 show inner components of the over-current protection device of FIG. 1.
Figure 4:
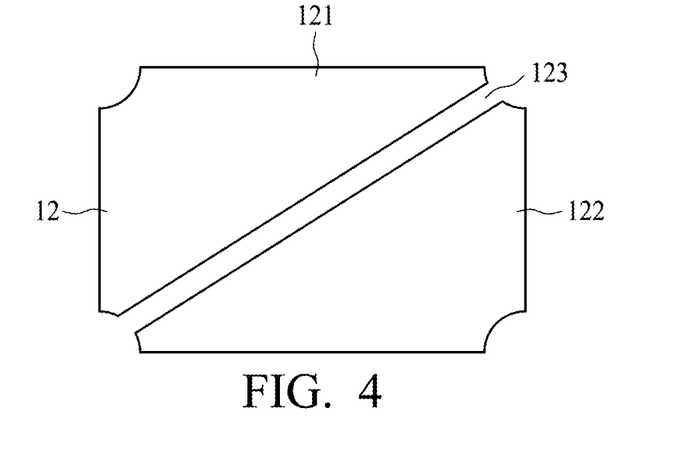
Figure 5:
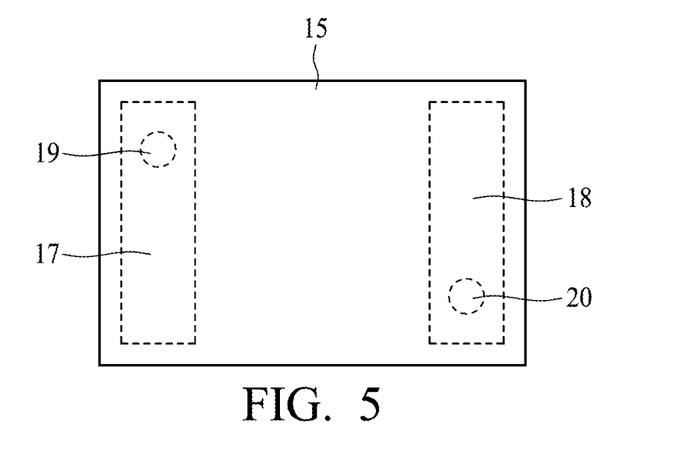

FIG. 3 shows a planar view of the second conductive layer 14 which is usually rectangular. In this embodiment, four corners of the second conductive layer 14 are arc-shaped in fitting the insulating members 22. FIG. 4 shows a planar view of the first conductive layer 12. The first conductive layer 12 comprises a first conductive section 121 and a second conductive section 122 separated by a gap or a trench 123. The trench 123 may extend along an oblique line or a diagonal line of the first conductive layer 12. In an embodiment, the first conductive section 121 and the second conductive section 122 have equivalent areas. FIG. 5 shows a planar view of the insulating layer 15. The first electrode layer 17 is disposed on the bottom of the first insulating layer 15 and electrically coupled to the first conductive section 121 through a conductive member 19. The second electrode layer 18 is disposed on the bottom of the first insulating layer 15 and electrically coupled to the second conductive section 122 through a conductive member 20. For precisely electrical connection, the conductive members 19 and 20 are located at two opposite oblique corners of the first insulating layer 15 corresponding to the first conductive section 121 and the second conductive section 122.

Figure 6:
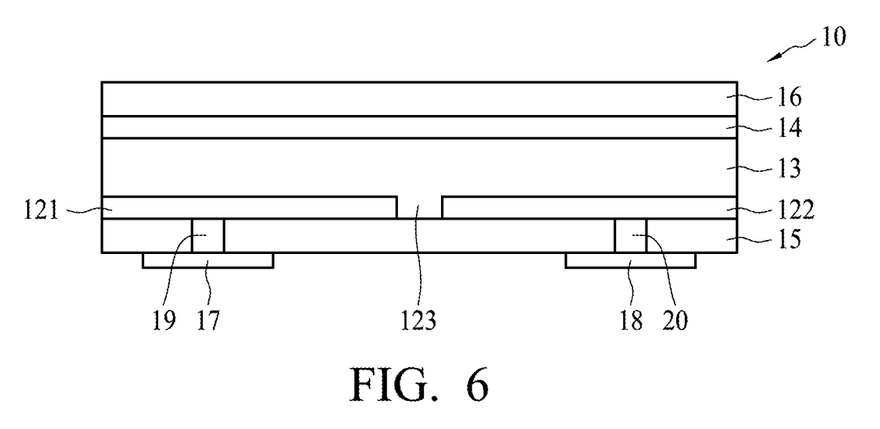
FIG. 6 shows a cross-sectional view along line 1-1 in FIG. 1.
Figure 7:
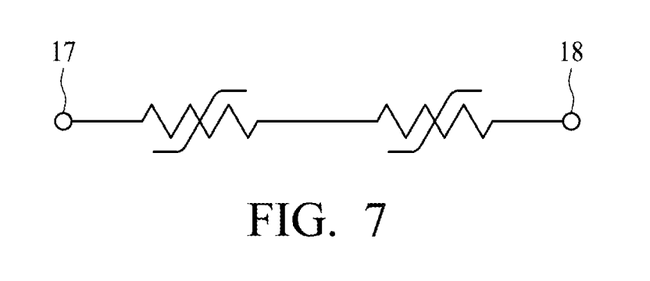
FIG. 7 shows a circuit diagram of the over-current protection device of FIG. 1.

FIG. 6 shows a cross-sectional view along line 1-1 of FIG. 1. Line 1-1 goes through the conductive member 19, the center of the device and the conductive member 20. The conductive member 19 penetrates through the first insulating layer 15 to electrically connect the first conductive section 121 and the first electrode layer 17. The conductive member 20 penetrates through the first insulating layer 15 to electrically connect the second conductive section 122 and the second electrode layer 18. It is observed in FIG. 6 that the over-current protection device 10 has a current path including the first electrode layer 17, the conductive member 19, the first conductive section 121, the PTC material layer 13, the second conductive layer 14, the PTC material layer 13, the second conductive section 122, the conductive member 20 and the second electrode layer 18 in order. Because current goes through the PTC material layer 13 twice, a circuit containing two PTC resistors in series connection is formed as shown in FIG. 7.

Referring to FIG. 4 and FIG. 5 again, the trench 123 extends along an oblique line of the first conductive layer 12 and is not parallel to a longitudinal direction of the first electrode layer 17 and the second electrode layer 18. Because conductive layers or electrode layers are usually made by metal, they are stronger than PTC material usually containing polymer. If the trench 123 is parallel to the longitudinal direction of the first electrode layer 17 and the second electrode layer 18, the structural strength would be insufficient to resist longitudinal torque. As a result, the over-current protection device 10 may be deformed or damaged during soldering onto a circuit board or inflation of PTC material in the event of over-current or over-temperature. By virtue of the design of the trench 123 not parallel to the longitudinal direction of the first and second electrode layers 17 and 18, the capability to resist longitudinal torque is enhanced effectively so as to avoid deformation. Moreover, unlike the traditional skill, the device of the present application has no plated through holes on the sidewalls, and therefore it is not affected by solder attaching stress.

Figure 8:
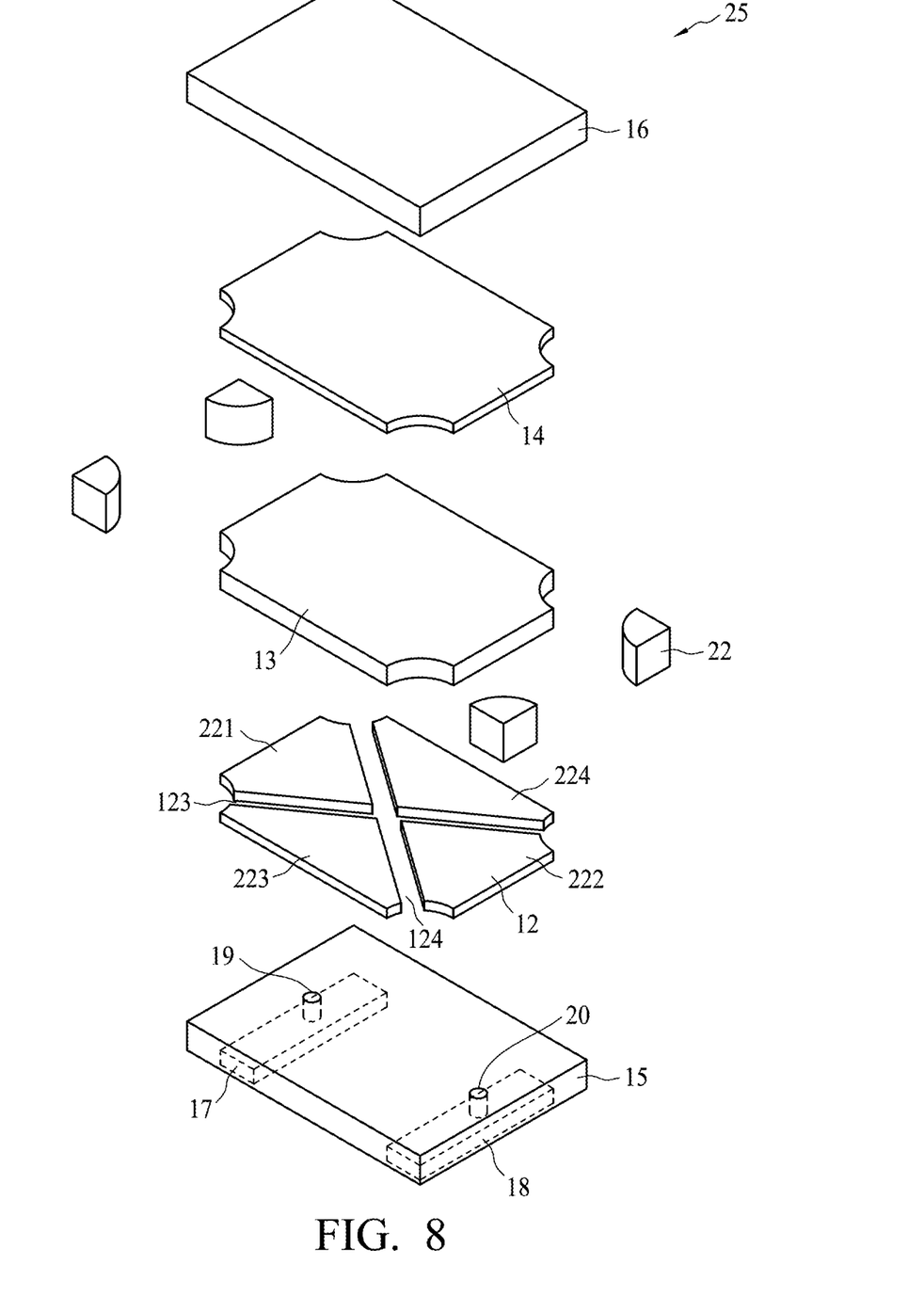
FIG. 8 shows an exploded diagram of an over-current protection device in accordance with another embodiment of the present application.

FIG. 8 shows an exploded view of an over-current protection device 25 in accordance with another embodiment of the present application. Similar to the previous embodiment except that intersecting trenches 123 and 124 divide the first conductive layer 12 into a first conductive section 221, a second conductive section 222, a third conductive section 223, and a fourth conductive section 224. In this embodiment, the trench 123 and trench 124 intersect and extend along two diagonal lines. The intersection may be formed by two oblique lines instead. The conductive member 19 is approximately located at the center of the first electrode layer 17 and electrically connect the first conductive section 221 and the first electrode layer 17. The conductive member 20 is approximately located at the center of the second electrode layer 18 and electrically connect the second conductive section 222 and the second electrode layer 18. The third conductive section 223 and the fourth conductive section 224 have no current flowing therethrough, and thus they are not essential elements and can be omitted. However, they may increase strength of the device. Compared to the first conductive section 121 and the second conductive section 122 in FIG. 4, the first conductive section 221 and the second conductive section 222 have smaller or approximately half areas. According to resistance rules, a smaller effective area provides higher resistance. In high resistance applications, the first conductive section 221 is preferably ⅕ to ⅓ of the first conductive layer 12 in area, and the second conductive section 222 is preferably ⅕ to ⅓ of the first conductive layer 12 in area. In practice, the first conductive section 221 and the second conductive section 222 are not limited to specific shapes. They may be round, elliptic or others.

Figure 9:
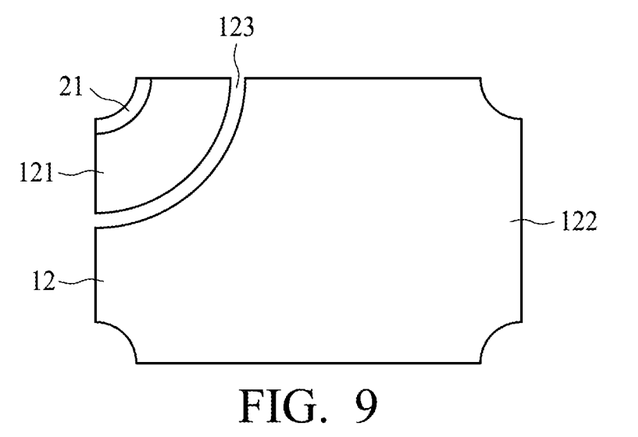
FIG. 9 shows the first conductive layer of an over-current protection device in accordance with another embodiment of the present application.
Figure 10:
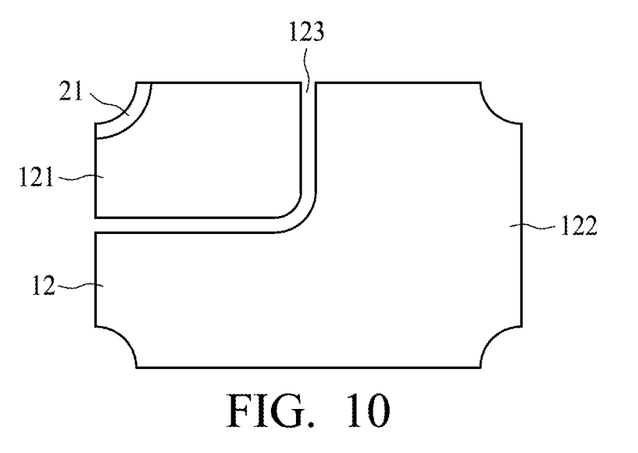
FIG. 10 shows the first conductive layer of an over-current protection device in accordance with yet another embodiment of the present application.
Figure 11:
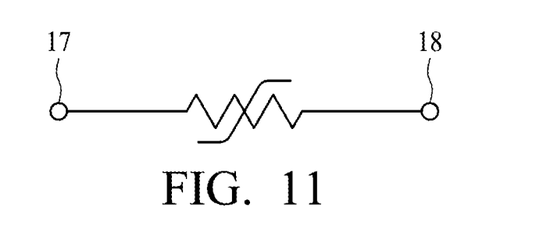
FIG. 11 shows a circuit diagram of the over-current protection device in accordance with another embodiment of the present application.

FIG. 9 shows the first conductive layer of an over-current protection device in accordance with another embodiment of the present application. The trench 123 is in arc shape and its two ends connect to adjacent lateral surfaces to divide the first conductive layer 12 into a first conductive section 121 and a second conductive section 122. A corner enclosed by the trench 123 is provided with a conductive member 21 connecting to the upper second conductive layer 14 to form electrical connection between the first conductive section 121 and the second conductive layer 14. The effective area of the PTC material layer 13 in the current path is equivalent to the area of the second conductive section 122. FIG. 10 shows the first conductive layer of an over-current protection device in accordance with yet another embodiment of the present application. The trench 123 is L-shaped and its two ends connect to adjacent lateral surfaces to divide the first conductive layer 12 into a first conductive section 121 and a second conductive section 122. A corner enclosed by the L-shaped trench 123 is provided with a conductive member 21 connecting to the upper second conductive layer 14 to form electrical connection between the first conductive section 121 and the second conductive layer 14. The trench 123 of the first conductive layer 12 in either FIG. 9 or FIG. 10 comprises a primary curve or horizontal portion not parallel to a longitudinal direction of the first electrode layer 17 and the second electrode layer 18 so as to resist deformation of the device caused by longitudinal torques. The conductive member 21 connects to the lower first conductive section 121 and the upper second conductive layer 14. Therefore, current directly goes through the conductive member 21 rather than the PTC material layer 13 between the first conductive section 121 and the second conductive layer 14. To sustain sufficient effective area of the PTC material layer 13 in the current path, the area of the second conductive section 122 is preferably 1.2, 1.5 or 2 times the area of the first conductive section 121. It is noted that current goes through the PTC material layer 13 between the second conductive section 122 and the second conductive layer 14 to form a circuit containing a PTC resistor, as shown in FIG. 11.

Figure 12:
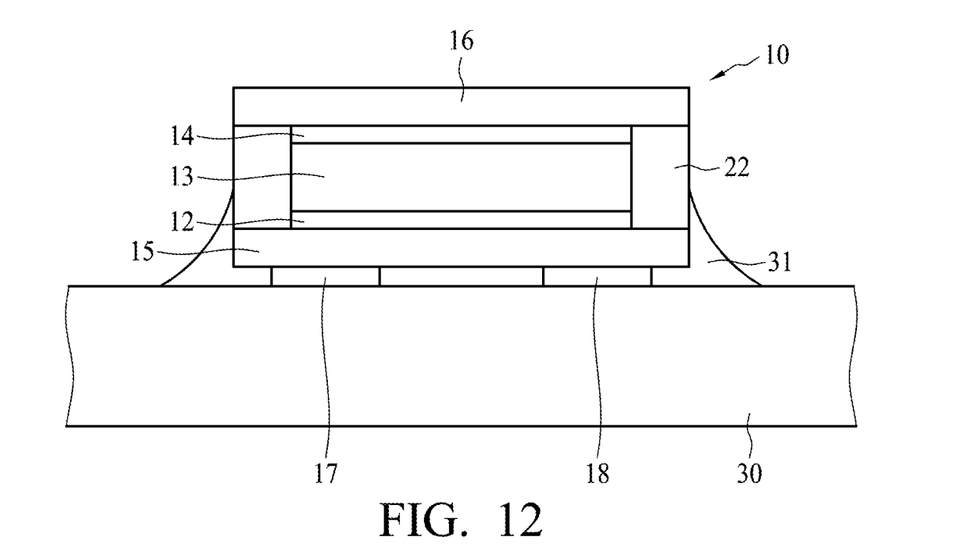
FIG. 12 shows an over-current protection device mounted on a circuit board in accordance with an embodiment of the present application.
Figure 13:
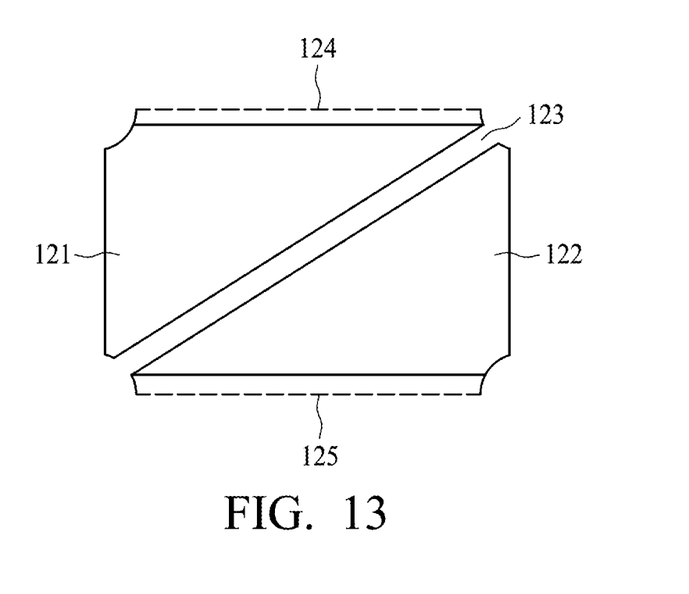
FIG. 13 shows the first conductive layer of an over-current protection device in accordance with still another embodiment of the present application.
Figure 14:
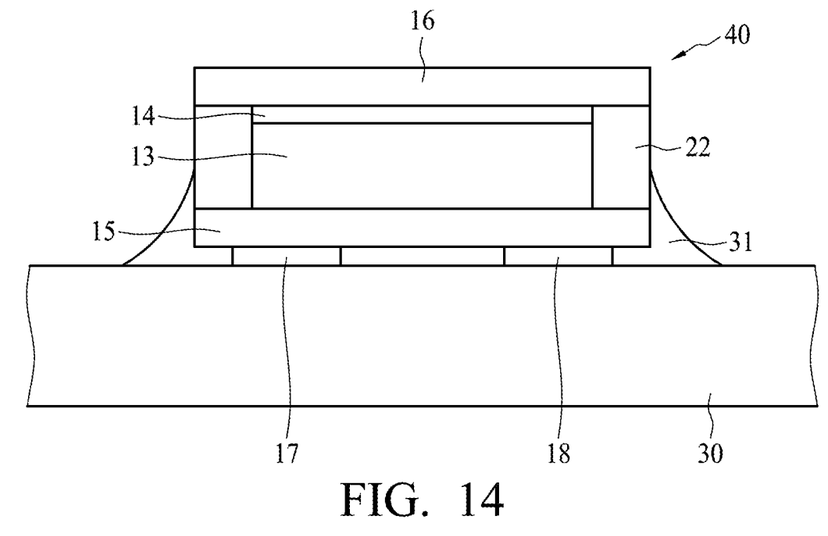
FIG. 14 shows an over-current protection device mounted on a circuit board in accordance with another embodiment of the present application.

FIG. 12 shows an over-current protection device soldered or surface-mounted onto a circuit board in accordance with an embodiment of the present application. The first electrode layer 17 and the second electrode layer 18 on the bottom of the over-current protection device 10 serve as bonding pads for being soldered onto a circuit board 30 through solder 31. Because solder 31 may be attached to lower portions of the four lateral surfaces near the first and second electrode layers 17 and 18, short circuit may occur if both the solder 31 of the first electrode layer 17 and the solder 31 of the second electrode layer 18 reach the first conductive layer 12. As a result, current does not go through the PTC material layer 13, and the therefore the PTC material layer 13 fails to function as it should. Although this problem seldom happens, the present application proposed a solution as described below. In FIG. 13, similar to the previous embodiment, the first conductive layer 12 comprises a first conductive section 121 and a second conductive section 122 separated by a trench 123. However, the longitudinal sides of the first conductive layer 12 retract. The dashed lines 124 and 125 are the sides of the first conductive layer 12 in FIG. 4, and the sides retract to the solid lines in this embodiment. The retracted areas are compensated by the first insulating layer 15. By doing so, the longitudinal sides of the first conductive layer 12 are not exposed to the corresponding lateral surfaces of the over-current protection device 40, as shown in FIG. 14, so as to avoid short circuit due to solder attachment.

Figure 15:
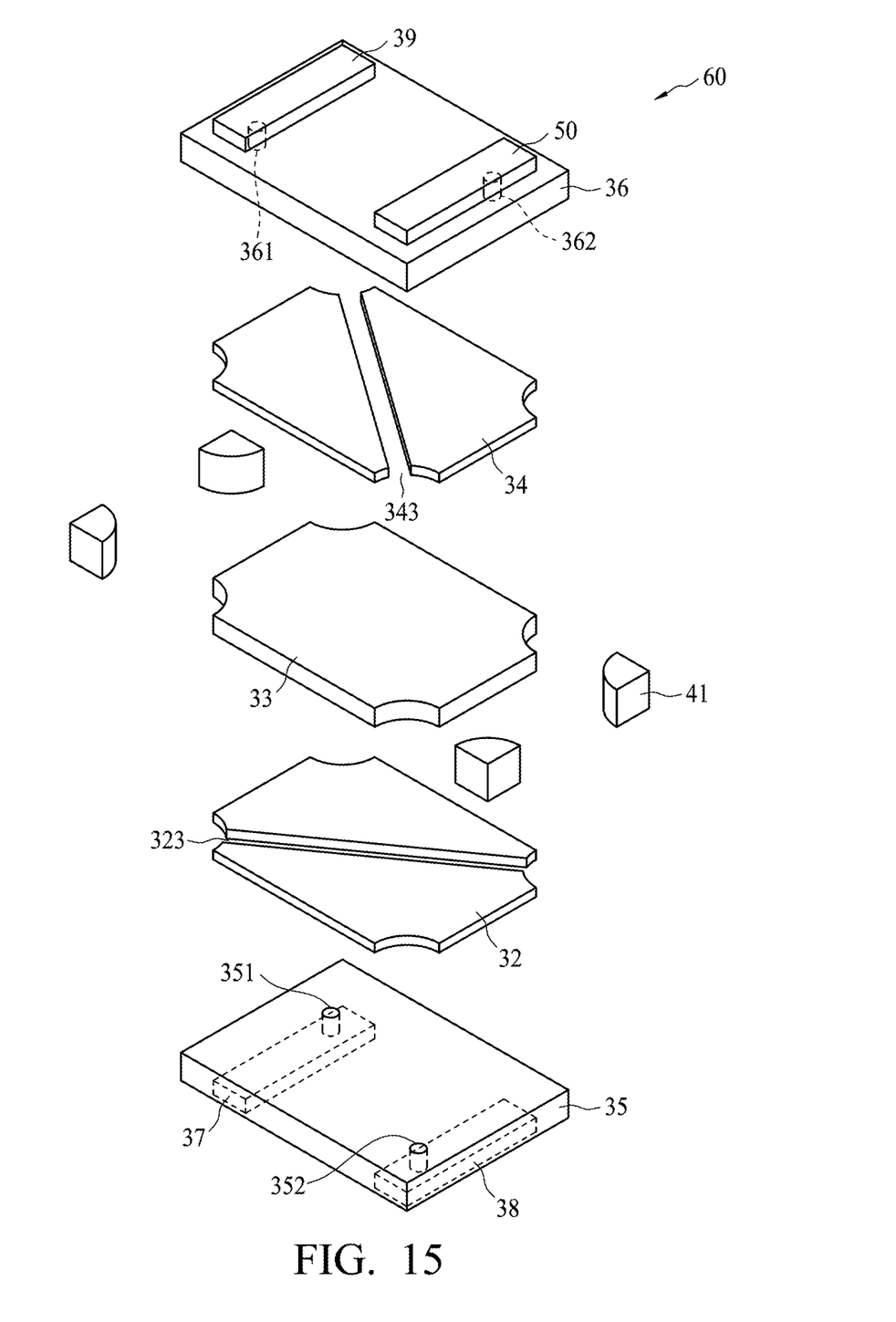
FIG. 15 shows an exploded diagram of an over-current protection device in accordance with an embodiment of the present application.
Figure 16:
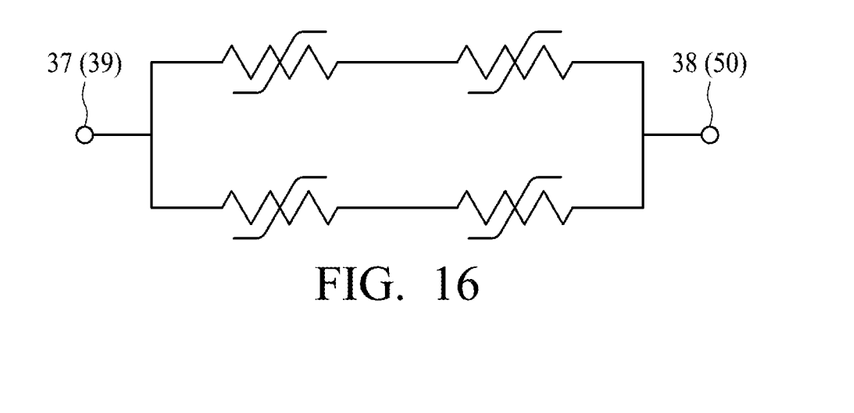
FIG. 16 shows a circuit diagram of the over-current protection device of FIG. 15.

In the abovementioned embodiments, the first electrode layer 17 and the second electrode layer 18 serving as bonding pads are placed at the bottom of the device, the orientation needs to be considered when soldering. In practice, both top and bottom surfaces may be provided with bonding pads to avoid identification of orientation. FIG. 15 shows an exploded view of an over-current protection device 60 comprising a first conductive layer 32, a PTC material layer 33, a second conductive layer 34, a first insulating layer 35, a second insulating layer 36, electrode layers 37, 38, 39 and 50, and four insulating members 41. Compared to the over-current protection device 10, the over-current protection device 60 further forms a trench 343 in the second conductive layer 34. The trench 343 of the second conductive layer 34 crosses over the trench 323 of the first conductive layer 32. The electrode layers 39 and 50 are disposed on the second insulating layer 36. The electrode layers 37 and 38 electrically connect to the two conductive sections separated by the trench 323 in the first conductive layer 32 through the conductive members 351 and 352, respectively. The electrode layers 39 and 50 electrically connect to the two conductive sections separated by the trench 343 in the second conductive layer 34 through the conductive members 361 and 362, respectively. As a result, either the electrode layers 37 and 38 or the electrode layers 39 and 50 can be bonding pads, and thus there is no need to consider orientation. Regardless of whether the bonding interfaces are the electrode layers 37 and 38 or 39 and 50, the equivalent circuit of the device is shown in FIG. 16 upon the intersection of the trench 323 and the trench 343.

Figure 17:
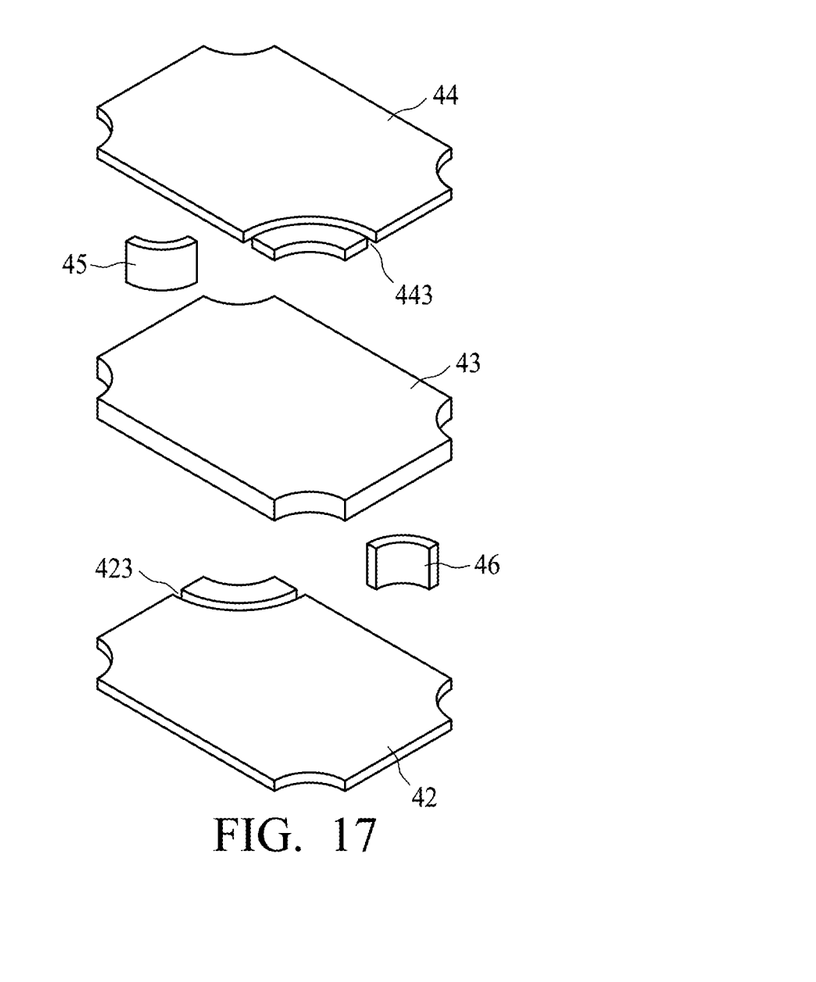
FIG. 17 shows an exploded diagram of inner components of an over-current protection in accordance with another embodiment of the present application.

Similarly, the designs of FIG. 9 and FIG. 10 can be modified as well to omit orientation identification. The modification of FIG. 9 is exemplified below. For clear explanation, FIG. 17 only shows essential elements, upper and lower insulating layers and electrode layers are omitted. A first conductive layer 42 and a second conductive layer 44 are disposed on opposite surfaces of a PTC material layer 43. The trench 423 is close to the upper left corner of the first conductive layer 42, and the trench 443 is close to the lower right corner of the second conductive layer 44. The upper left corner and the lower right corner are provided with conductive members 45 and 46 to connect the first conductive layer 42 and the second conductive layer 44, respectively. The different conductive sections of the first conductive layer 42 can electrically connect to two bottom electrode layers or bonding pads, whereas the different conductive sections of the second conductive layer 44 can electrically connect to two top electrode layers or bonding pads. The bonding pads electrically connecting to either the first conductive layer 42 or the second conductive layer 44 can serve as current input and output interfaces, and therefore identification of soldering orientation is not needed.

The primary portion of the trench of the first conductive layer is devised to be not parallel to the longitudinal direction of the first and second electrode layers, thereby increasing the strength to resist device deformation when PTC material inflates. Moreover, upper and lower insulating layers improve structural support, and insulating members at four corners decrease blur after cutting. These designs are suitable for miniaturized devices, e.g., 0402 or 0201 size. The over-current protection device of the present application may comprise a circuit of one or two PTC resistors as desired to provide design flexibility.

The above-described embodiments of the present invention are intended to be illustrative only. Numerous alternative embodiments may be devised by persons skilled in the art without departing from the scope of the following claims.

What is claimed is:

1. An over-current protection device being a hexahedron of an upper surface, a lower surface and four lateral surfaces, comprising:
   a PTC device comprising a first conductive layer, a second conductive layer and a PTC material layer, the first conductive layer being disposed on a first surface of the PTC material layer, the second conductive layer being disposed on a second surface of the PTC material layer, the second surface being opposite to the first surface, the first conductive layer comprising a first conductive section and a second conductive section separated by at least one trench;
   a first insulating layer disposed on the first conductive layer;
   a first electrode layer disposed on the first insulating layer and electrically coupled to the first conductive section; and
   a second electrode layer disposed on the first insulating layer and electrically coupled to the second conductive section;
   wherein corners of the four lateral surfaces are provided with insulating members, and each of the insulating members is in the form of a ¼ cylinder;
   wherein the first and second electrode layers are on a same plane; and
   wherein the trench comprises a primary portion not parallel to a longitudinal direction of the first electrode layer and the second electrode layer.

2. The over-current protection device of claim 1, wherein the first electrode layer and the second electrode layer are in stripe shapes extending in a first direction, and the primary portion of the trench extends in a second direction not parallel to the first direction.

3. The over-current protection device of claim 1, wherein the trench extends along an oblique line of the first conductive layer.

4. The over-current protection device of claim 1, wherein the trench extends along a diagonal line of the first conductive layer.

5. The over-current protection device of claim 1, wherein the first conductive section and the second conductive section have equivalent areas.

6. The over-current protection device of claim 1, wherein the trench connects to two adjacent lateral surfaces.

7. The over-current protection device of claim 6, wherein the trench is arc-shaped or L-shaped.

8. The over-current protection device of claim 6, wherein an area of the second conductive section is more than 1.2 times an area of the first conductive section.

9. The over-current protection device of claim 8, wherein the first conductive section electrically connects to the second conductive layer.

10. The over-current protection device of claim 1, wherein the first conductive layer is divided into the first conductive section and the second conductive section by two intersecting trenches.

11. The over-current protection device of claim 10, wherein the first conductive section is ⅕ to ⅓ of the first conductive layer in area, and the second conductive section is ⅕ to ⅓ of the first conductive layer in area.

12. The over-current protection device of claim 1, wherein the first conductive layer has two longitudinal opposite sides not exposed to corresponding lateral surfaces between the first electrode layer and the second electrode layer.

13. The over-current protection device of claim 1, further comprising a second insulating layer disposed on the second conductive layer.

14. The over-current protection device of claim 1, wherein the second conductive layer is divided into other two conductive sections by another trench, and the trench of the second conductive layer crosses over the trench of the first conductive layer.

* * * * *